Patented Mar. 20, 1934

1,951,994

UNITED STATES PATENT OFFICE 1,951,994

PROCESS FOR THE PREPARATION OF ARTIFICIAL SILK

Joseph Rochet, Paris, France, assignor to Compagnie de Produits et Chimiques Electrométallurgiques, Alais, Froges et Camargue, Paris, France, a corporation of France No Drawing. Application February 2, 1929, Serial No. 337,173. In France February 4, 1928

7 Claims. (Cl. 18—54)

It is known that urea or cyanamide or their derivatives are capable of yielding, with formic aldehyde or its derivatives, in an aqueous medium, solution of condensation products giving rise to uncoloured and perfectly transparent plastic materials. These condensations allow of obtaining, starting from relatively inexpensive raw materials, nitrogenated colloidal substances akin to albuminoid substances and of thus attaining the preparation of threads having a chemical composition approaching that of natural silk and presenting analogous properties, inter alia as regards facility of dyeing. It has already been mentioned that it is possible to obtain artificial threads starting from these condensation products, but no information was ever given as regards the conditions to be fulfilled for this purpose. It has likewise been proposed to employ sulphur dioxide, in the gaseous state or as a solution in acetone, in a general process for the hardening of urea-formaldehyde condensation products, and inter alia, in a process for the coagulation of threads leaving a spinning nozzle, but no information was given by the proponents of this proposal as to the degree of condensation necessary for obtaining threads capable of industrial utilization.

I have found that certain conditions are necessary in order that the condensation products obtained may be transformable into threads capable of industrial utilization. It is necessary first of all that the solutions of the products shall be sufficiently viscous, but not too much so, in order to be able to be drawn out into threads. It is further necessary that the threads formed can be rapidly coagulated by passage into a suitable bath.

I have ascertained that if the first condition could be realized with sufficient facility by evaporation of a portion of the water from the solution, the same is not the case as regards the second, which can only be realized when the condensation has been pushed to a clearly defined and fairly precise stage. Before this stage, the thread formed re-dissolves in the coagulating bath or at least does not coagulate sufficiently rapidly. As soon as this stage is passed, the solution is too viscous and no longer passes through the spinning orifices.

This stage corresponds to the moment when the liquid product obtained by heating of a mixture of formaldehyde and urea in an aqueous solution, previously neutralized if the primary materials are not already neutral, collects together into a homogeneous viscous mass when poured in an excess of water. Before this stage the condensation generally passes through two other stages; in the first the product poured into water remains dissolved; in the second the product poured into water gives a flocculent white precipitate which collects together only very slowly.

The respective quantities of urea and of formaldehyde to be employed may be variable; the optimum quantities are two molecules of formaldehyde for one molecule of urea. The operation can be carried out with less than two molecules of formaldehyde, but the threads have a tendency to be less transparent. With more than two molecules, the quantity of formaldehyde unutilized becomes greater.

The neutralization of the formaldehyde-urea mixture can be carried out in various ways. It can be neutralized with a suitable quantity of alkalies or of salts having alkaline reaction, until the pH value of the solution is approximately 7. The solution can be agitated with an insoluble carbonate, such as carbonate of lime or magnesia. Lastly there can be employed ammonia in excess of that necessary for neutralizing the ammonia combining in part with the formaldehyde to give substantially neutral hexamethylene-tetramine. This last method of neutralization is particularly advantageous, for in this case the pH value of the solution diminishes in proportion as the condensation progresses, and the advance of the latter is more rapid.

In order to bring the condensation to the suitable stage and the solution to a suitable viscosity for spinning, the operation can be carried out in several ways. Heating may be effected at boiling point until a trial sample indicates that the stage is attained, the solution being then concentrated, either at low temperature under reduced pressure, or at atmospheric pressure, taking care beforehand to stabilize the solution by rendering it alkaline with an alkali or a salt having alkaline reaction, such as sulphite, acetate or phosphate of soda for example. The heating can likewise be stopped before the suitable stage of condensation, a portion of the water evaporated, and the condensation then left to continue slowly at the ordinary temperature up to the desired stage.

The product, thus brought into the suitable state of concentration and condensation, can be easily spun in suitable devices such as those utilized in the artificial silk industry. Coagulation takes place with the aid of an acid bath, which can be either a dilute solution of mineral or organic acids, or a concentrated solution of a neutral salt acidified with an acid, or a solution of a naturally acid salt, weak base and strong acid, such as sulphate of alumina for example.

By way of example there may be employed the following detailed methods of operation:

Example 1

30 kgs. of urea are dissolved in 80 litres of commercial formaldehyde of 40%, the solution being agitated with carbonate of lime and filtered. The filtered solution is carried to boiling point in an apparatus provided with a reflux condenser. After two to three hours of boiling, the heating is continued without the condenser, and from time to time a test sample is taken until the product poured into water precipitates therein and collects there into a viscous slightly translucent mass. At this moment three litres of a saturated solution of di-sodic phosphate are added, and the product is evaporated under reduced pressure preferably until there remains only about half of the water contained initially in the solution.

After cooling, the product is spun in a suitable apparatus. The thread, at leaving the spinning nozzle, passes into a coagulation bath constituted by a saturated solution of sulphate of magnesia or sulphate of soda to which sulphuric acid has been added until it turns bromophenol to yellow from blue. The threads are then washed in water and dried.

Example 2

To commence with, the free acid content of the commercial formaldehyde is determined by analysis. There is added to the latter a suitable solution of formic acid such that its total acidity shall be 2.3 grams of formic acid per litre. To 90 litres of the formol solution thus acidified, there are added 5 litres of ammonia of 22 degrees and 30 kgs. of urea; after solution and filtration, the solution is raised to boiling point and this maintained for ten minutes, there being then added 5 litres measured exactly of semi-normal caustic soda, having 20 grams of NaOH per litre. Boiling is maintained for twenty minutes. The solution is then concentrated by boiling until 30 kgs. of water in all have been driven off. This concentration must not last more than half an hour. The product is then put aside at the ordinary temperature. From time to time a sample is abstracted in order to examine if the product is fit for spinning. After a time which may vary from 8 to 15 days, the product precipitates in water as has been stated above, and the thread coagulates rapidly in the coagulating bath. The solution is then introduced into a spinning machine, containing a coagulating bath constituted by a solution of sulphate of alumina, of concentration approximating to saturation. The thread is then passed into a solution of soap, then washed with water and dried.

The urea and formol can be replaced wholly or in part by derivatives of these bodies, such for example as sulpho-urea and hexamethylene-tetramine or trioxymethylene. Likewise all or part of the urea can be replaced by cyanamide or its derivatives, such as dicyandiamide. Lastly, there can be added to the solution, either before or after condensation, products capable of condensing likewise with formol, such as the phenols.

There may also be added to the solution, before the spinning, substances acting as plastifiers, intended to give more flexibility to the threads obtained, such as for example glycerine, glycol, sulpho-ricinoleate of soda or cyclo-hexanol.

Likewise after spinning and coagulation, the threads may be subjected to various treatments, such as passage through an oxidizing bath or through a bath containing sulphurated hydrogen or through baths precipitating salts upon the fibre or any other treatments of the same kind, intended either to improve the mechanical properties of the thread or to increase its density.

In the hereafter appended claims, the term "urea" comprehends urea and its derivatives, such as thio-urea or mixtures of urea and of its derivatives; the term "cyanamide" likewise comprehends cyanamide and its derivatives such as dicyandiamide, or mixtures of cyanamide and of its derivatives, and the term "formaldehyde" likewise comprehends formaldehyde and its derivatives, such as hexamethylene-tetramine or trioxymethylene, or mixtures of formaldehyde and of its derivatives.

What I claim is:

1. A process of manufacturing artificial silk which comprises, mixing urea with formaldehyde in an aqueous medium so as to cause condensation products to be formed, removing from time to time from said medium small quantities of the condensation products that are obtained and dropping them into water, stopping the condensation when the samples thus dropped into water form therein a homogenous viscous mass, spinning the solution of the condensation products thus obtained, and coagulating the thread by causing it to pass through an acid saline solution.

2. A process of manufacturing artificial silk which comprises, mixing urea with formaldehyde in an aqueous medium so as to cause condensation products to be formed, removing from time to time from said medium small quantities of the condensation products that are being obtained and dropping them into water, stopping the condensation when the samples thus dropped into water form therein a homogenous viscous mass, concentrating said condensation products, spinning that concentrated solution, and coagulating the thread by causing it to pass through an acid saline solution.

3. A process of manufacturing artificial silk which comprises, mixing urea with formaldehyde in an aqueous medium so as to cause condensation products to be formed, removing from time to time from said medium small quantities of the condensation products that are being formed and dropping them into water, stopping the condensation step when the samples thus dropped into water form therein a homogenous viscous mass, adding plastifying substances to the solution of said condensation products, spinning that solution, and coagulating the thread by causing it to pass through an acid saline solution.

4. A process of manufacturing artificial silk which comprises, allowing a mixture of urea with cyanamide to react on formaldehyde in an aqueous medium so as to cause the condensation products to be formed, removing from time to time from said medium small quantities of the condensation products that are being formed and dropping them into water, stopping the condensation when the samples thus dropped into water form therein a homogenous viscous mass, spinning the solution of the condensation products thus obtained, and coagulating the thread by causing it to pass through an acid saline solution.

5. A process of manufacturing artificial silk which comprises, allowing a mixture of urea and cyanamide to react on formaldehyde in an aqueous medium so as to cause condensation products to be formed, removing from time to time from said medium small quantities of the condensation products that are being formed and dropping them into water, stopping the condensation when the samples thus dropped into water form therein a homogenous viscous mass, concentrating the solution of condensation products thus obtained, spinning that concentrated solution, and coagulating the thread by causing it to pass through an acid saline solution.

6. A process of manufacturing artificial silk which comprises, allowing a mixture of urea and cyanamide to react on formaldehyde in an aqueous medium so as to cause condensation products to be formed, removing from time to time from said medium small quantities of the condensation products that are being formed and dropping them into water, stopping the condensation when the samples thus dropped into water form therein a homogenous viscous mass, adding plastifying substances to the solution of said condensation products, spinning that solution, and coagulating the thread by causing it to pass through an acid saline solution.

7. A process of manufacturing artificial silk according to claim 2 in which the solution of condensation products is alkalized before being concentrated.

JOSEPH ROCHET.